Nov. 26, 1957 T. E. SHOUP ET AL 2,814,716
STUD WELDING METHOD AND DEVICE
Filed April 8, 1954 2 Sheets-Sheet 2

INVENTOR.
Thomas E. Shoup
Roger W. Sholle
BY L. John Mowry
Clyde H. Haynes
their atty.

United States Patent Office 2,814,716
Patented Nov. 26, 1957

2,814,716

STUD WELDING METHOD AND DEVICE

Thomas E. Shoup, Amherst, Roger W. Sholle, Lorain, and Lorenz John Mowry, Elyria, Ohio, assignors to Gregory Industries, Inc., Detroit, Mich., a corporation of Michigan Application April 8, 1954, Serial No. 421,780

12 Claims. (Cl. 219—98)

This invention relates to a new method and apparatus for stud welding.

In the majority of stud welding equipment on the market the stud is connected to one side of a source of welding current and a plate to which the stud is to be welded is connected to the other side of the source of welding current. In the most popular equipment a solenoid in a stud welding gun is connected in series with the stud. As soon as welding current starts to flow through the solenoid, the stud and plate, the solenoid retracts the stud from the plate to draw an arc between the stud and the plate. This arc is initiated by the welding current which flows through the solenoid. After the arc has continued for a definite period of time sufficient to melt the end of the stud and the plate, the source of welding current is disconnected and the stud is plunged into the plate. This apparatus and method has produced excellent results on studs of various diameters and materials.

In another type of stud welding wherein an arc is drawn between the stud and the plate, the stud was also lifted from the plate to establish an arc by a solenoid. However, the solenoid was powered by a circuit entirely independent of the welding circuit. A design of this type required very close control of the switches and contactors in both circuits to ensure correct timing of operation.

In another type of stud welding a high frequency current superimposed on the welding current has been used to initiate an arc between the stud and the plate. This type of equipment does not necessarily need a solenoid since the stud can be positioned at the arc distance from the plate and the high frequency current will span the gap to initiate an arc.

In another of the prior devices a solenoid was used to lift the stud from the plate to establish an arc. In this device a solenoid, the stud, and the plate were connected in series to a source of relatively low current value. The sole purpose of this low current was to lift the stud and strike an arc. The welding current source was then connected to the stud and plate with the welding current also flowing through the arc to melt the end of the stud and the plate. In this device separate sources of current were needed for the welding and for the arc initiating current. The arc initiating current flowed throughout the entire duration of the flow of welding current.

These prior devices which require two sources of current do not lend themselves to a portable hand tool which can easily be moved from place to place. Many applications of stud welding are performed from battery power, rectifiers or motor generator sets, in such places as new construction, steel mills, etc. Many times on construction jobs and even in other locations portable power units must be used for the welding. If the stud welding equipment will work on a single source of power, the cost and amount of equipment needed for power is greatly reduced. It is only necessary to supply one power source for the present invention.

One of the objects of the invention is to provide a portable stud welding tool which will operate from a single source of power and which is adapted to weld many sizes of studs.

Another object of the invention is to provide a stud welding device and method which lends itself to a small, compact, lightweight hand tool which will accommodate studs of many sizes.

Another object of the invention is to provide a stud welding device in which the lifting current is not varied by variations in the welding current even though both currents are obtained from the same source of power.

Another object of the invention is to provide a stud welding hand tool which will weld studs from approximately 1/8" diameter to over 1½" diameter without excessive heating of the hand tool.

Another object of the invention is to provide a method of stud welding wherein the stud, plate and a lifting coil are connected in series to a source of current followed by the connecting of the source of current directly to the stud and plate to melt the end of the stud and simultaneously shunt the lifting coil to render it ineffective and finally plunging the stud into the plate and disconnecting the source of current.

Another object of the invention is to provide a method of stud welding wherein the lifting coil is shunted by the connecting of the source of current to the stud and wherein a holding coil is simultaneously energized to hold the stud at the arc distance from the plate.

Other objects and a fuller understanding of the invention will become apparent from the following description and claims when taken in conjunction with the drawings in which:

Figure 1:
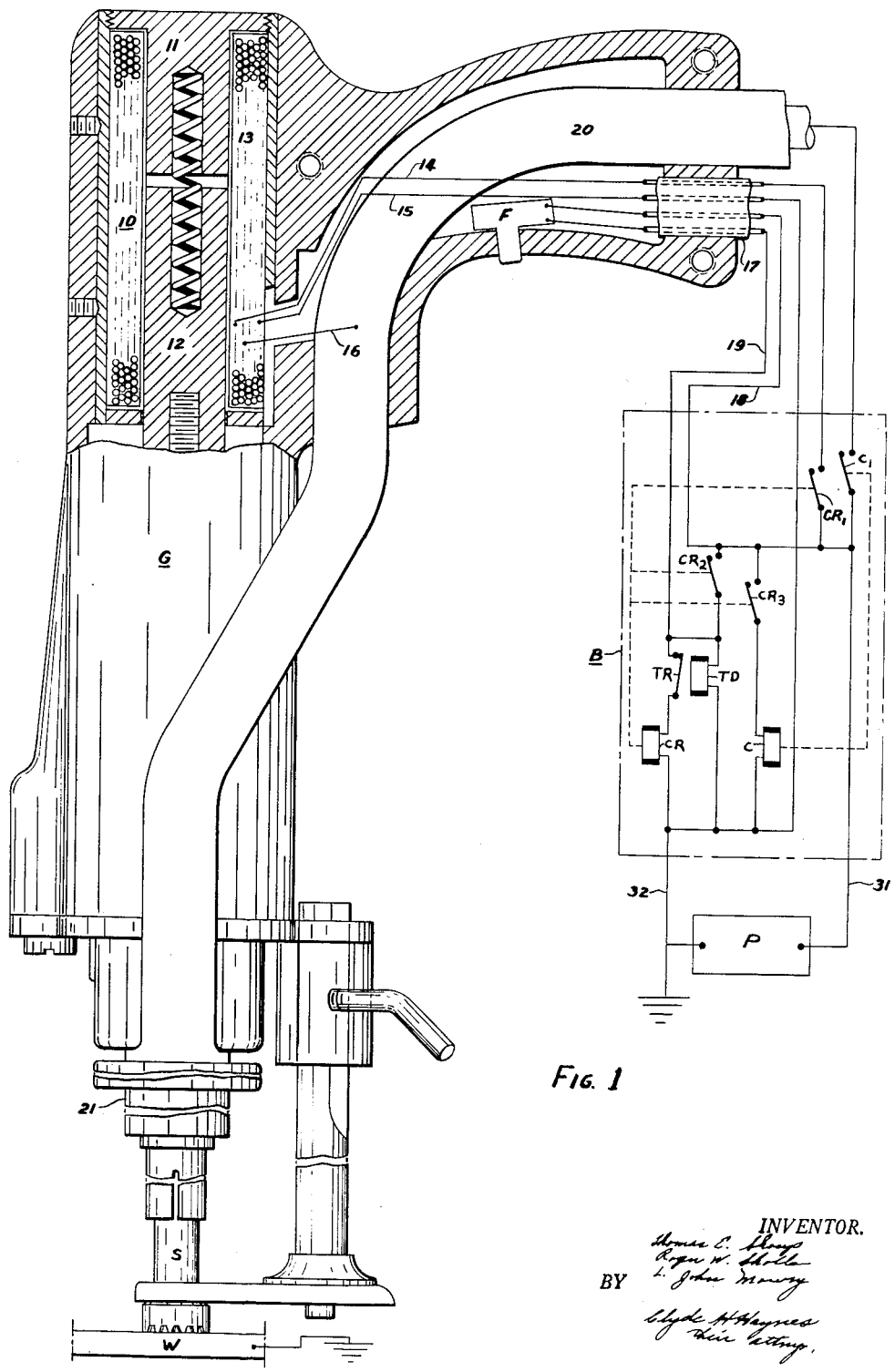
Figure 1 is a view partly in section illustrating a stud welding hand tool and the circuit to operate it.

Figure 1 illustrates a complete set of equipment needed to practice the method of stud welding as described and claimed herein. In practicing this invention a welding current source P supplies power for welding a stud S to a work plate W. The stud S is held by a stud welding gun G designed as a small hand tool and is connected to the welding current source P through a control box B. Complete electrical circuit for welding is obtained by grounding one side of the welding current source P and the work plate W to which the stud is to be welded. The control box B starts to operate to control the electrical circuits and the welding of the stud by closing a gun button finger switch F mounted in the handle of the gun G. Details of operation and structure of the various parts will be described later.

In using apparatus to carry out the method of stud welding the operator simply connects the control box B to the welding current source P and then connects welding gun G to the control box B. A stud S of a desired size and shape is fixed in the gun G and the gun is positioned relative to the work plate W to place the stud against the work plate. Manually pressing on the gun button F causes the control box to start the flow of current to lift the stud from the plate and draw an arc between the stud and the plate. The control box then causes a heavy welding current to flow through the stud, the arc and the plate in a circuit which will shunt a part of the arc initiating and stud lifting circuit. After the heavy welding current has sufficiently melted the end of the stud, the control box disconnects the welding current source and the gun plunges the stud into the plate.

Welding current source

The welding current source P may be a commercially available battery unit, motor generator set, rectifier set, or any other source of heavy current which will provide sufficient power for melting the end of the stud and the adjacent portion of the work plate. For small cross section studs, such as ⅛″ or ¼″ diameter stud, the power source is much lighter than the power source for welding large cross section studs such as a 1½″ diameter stud. In welding the large diameter or cross section studs the power source must be capable of supplying upwards of 5000 amperes or more of welding current for a period of time from one to two seconds.

The gun and solenoid

The gun G or hand tool used in the stud welding operation is mechanically very similar to that illustrated in Patent No. 2,413,189, issued to T. Nelson, December 24, 1946; and Patent No. 2,416,915, issued to C. S. Evans, March 4, 1947. The gun includes similar parts, including a plunger spring schematically illustrated in Figure 2 to those parts illustrated in the previous patents.

The major change in the present gun from the prior gun is in the solenoid coils used to lift the stud from the plate during welding. In the present gun the solenoid 10 includes a stationary armature 11 and a movable armature 12 mounted within the solenoid coil 13. The solenoid coil 13 has many turns of fine wire which are incapable of carrying welding current. The coil 13 is energized by the control box B through end leads 14 and 15 and a center lead 16 which is connected between the ends of the coil. The end leads 14 and 15 are connected to the control box by a control cable 17 mounted in the handle of the gun in such a manner that the end leads 14 and 15 pass through the handle to the solenoid coil 13. The control cable 17 also carries leads 18 and 19 which are connected to the gun button or finger switch F mounted in the handle for manual starting of the welding cycle.

Since the solenoid coil is constructed of wire which is incapable of carrying the welding current, a welding current cable 20 is fastened to the gun's stud holding means 21 and passes through the handle for connection directly to the control box. The center lead 16 from the solenoid coil 13 is electrically connected to this welding cable 20 within the gun or hand tool. Such a connection is perfectly safe since the current flowing through the center lead 16 is relatively small.

The portion of the coil 13 between leads 14 and 16 is termed the lifting portion and the portion of the coil between leads 16 and 15 is termed the holding portion. These portions may be wound of the same diameter wire, however, it is more advantageous if the lifting portion of the coil is wound from wire which will carry heavier current than the holding portion, even though both are very fine wire. Best operation is obtained when the magnetic polarity of these two portions are in the same direction so that the magnetic field established by the holding coil will be in the same direction as the field originally established by the lifting coil. When these fields are in the same direction, there is no apparent momentary field collapse in the solenoid at the instant the lifting coil is shunted out and the holding coil is simultaneously energized.

A particular effect is noted when the magnetic field established by the holding coil is reversed to that established by the lifting coil. Namely, simultaneous energization of the holding coil and de-energization of the lifting coil causes a momentary complete collapse and reversal of the magnetic field. This affects the maintaining of an arc gap between the stud and the plate. This momentary collapse and reversing of the magnetic field allows the plunger spring 22 to start the stud towards the plate. If the stud starts towards the plate and the holding coil is not sufficiently strong to re-lift it, the stud will continue to plunge into the plate. Thus, if this feature is not definitely desired, it is necessary to keep the magnetic fields established by the lifting and holding coil in aligned polarity so that the holding coil will keep the stud retracted from the plate after the lifting coil has been de-energized.

Control box

Figure 2:
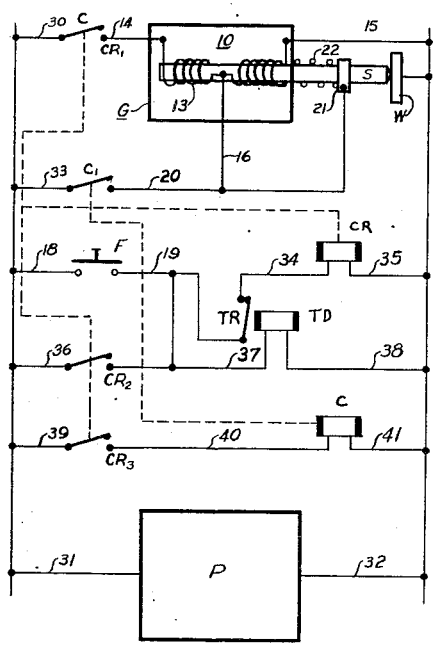
Figure 2 is a schematic illustration of the invention.

The control box B may be constructed of any suitable material in the form of a housing which will contain the electrical circuit control equipment. Such a box must be rugged to withstand abuse obtained through normal usage of the equipment in steel mills, construction jobs, railroads, shipbuilding, etc. The control circuit illustrated in Figure 1 is identical to the schematic illustration of Figure 2. In Figure 2 the gun is illustrated schematically as containing a solenoid coil, an armature, stud holder and the stud plunger spring 22. The stud lifting coil is capable of overcoming the stud plunger spring to lift the stud from the work plate W. When the coil is de-energized, the plunger spring 22 plunges the stud into the work plate W.

The electrical circuits contained in the control box include a contactor C1 operated by a contactor coil C, a time delay relay switch TR operated by a time delay coil TD and control relay switches CR1, CR2 and CR3 controlled by a control relay coil CR. One end of the coil 13 is connected by the end lead 14 to one side of the control relay switch CR1. The other side of the control relay switch CR1 is connected by a lead 30 to one side 31 of the welding current source P. The other end of the coil 13 is connected through end lead 15 to the other side 32 of the welding current source. As was previously described, the lead 16 from the coil 13 is connected to the welding cable 20 within the gun handle. The welding current 20 is connected to one side of the contactor C1 located within the control box and the other side of the contactor C1 is connected to one side 31 of the welding current source by suitable welding current lead cable 33. The lead 18 from the gun button F is also connected to the side 31 of the welding current source and the lead 19 from the other side of the gun button is connected to one side of the time delay relay switch TR. A lead 34 connects the other side of the time delay relay switch TR to one side of the control relay coil CR and lead 35 connects the other side of the control relay coil CR to the side 32 of the welding current source. One side of the control interlock relay switch CR2 is connected to side 31 by lead 36 and the other side of this switch CR2 is connected to the time delay coil TD by lead 37. The time delay coil TD is also connected to the side 32 by the lead 38. As is illustrated in Figure 2, the leads 19 and 37 are electrically joined. The control relay contactor switch CR3 has one side thereof connected by lead 39 to side 31 of power source P and the other side thereof connected by lead 40 to one side of the contactor coil C, the other side of which is connected to side 32 of the welding current source by a lead 41.

The welding circuit and control circuits operate as follows: After a stud is placed in the gun and the gun positioned against the work plate W, the operator presses gun button F to electrically connect leads 18 and 19. This starts a relatively low value current flowing through leads 18, 19 and 37, time delay coil TD and lead 38 to energize the time delay coil TD. Current also flows through leads 18, 19, 34 and 35 and normally closed time delay relay switch TR to energize the control relay coil CR. Energization of control relay coil CR causes it to close switches CR1, CR2 and CR3. The closing of the switch CR2 shunts out the gun button and leads 18 and 19 with current flowing through lead 36 to maintain energization of control relay coil CR and time delay coil TD in case the gun button is released during the welding cycle. The closing of switch CR1 causes current to flow from the welding current source through lead 31, lead 30 and lead 14 through the lift portion of the coil 13, through lead 16, welding cable 20, stud holder 21, stud S, work plate W to lead 32 on the other side of the welding current source. This relatively low current flow is sufficient to cause the coil 13 to lift the stud S from the plate W and strike an arc between the stud and plate.

The control relay contactor switch CR3 is closed substantially simultaneously with switch CR1, and current flow is established from power source side 31 to side 32 through leads 39 and 40, contactor C and lead 41 at the same time the lifting coil is energized to strike the arc. As soon as coil C is energized, it closes contactor C1 allowing welding current to flow from power source side 31 through welding cable 33, welding cable 20, stud holder 21, stud S and work plate W to side 32 of the welding current source. Closing of contactor C1 completely shunts control relay switch CR1, the lifting portion of the coil 13 and leads 14 and 30 rendering the lifting coil ineffective. The holding portion of the coil 13 is connected simultaneously in parallel with the arc by the leads 16 and 15 to energize this portion of the coil to hold the stud away from the plate for maintaining the arc.

After a predetermined duration of time, the time delay relay switch TR opens, thus de-energizing control relay coil CR. De-energizing control relay coil CR opens switches CR1, CR2 and CR3. Opening the switch CR3 de-energizes contactor coil C which in turn opens the contactor C1. Opening of contactor C1 stops the flow of welding current through the stud and also stops the flow of very light current through the holding portion of coil 13 allowing plunging spring 22 to plunge the stud into the work plate. All of the switches and parts of the circuit and control box are now in their original position so that another stud can be placed in the gun for welding to the work plate at another position.

When the circuit of Figure 2 is used, the plunging spring 22 is held in compressed position and does not start the stud towards the plate until after contactor C1 has stopped the flow of welding current, thereby de-energizing the holding coil and the welding arc.

Figure 3:
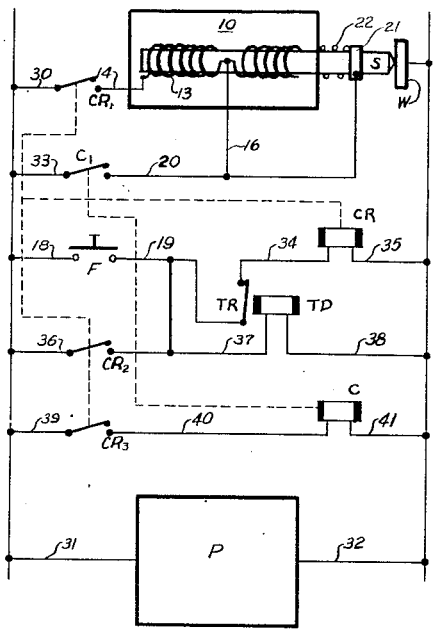
Figure 3 is a schematic illustration of a modification of the invention.

A variation of this method results from using the circuit of Figure 3 which is identical to that of Figure 2 except that end lead 15 has been eliminated. Pressing the finger button F initiates the welding arc and lifts the stud from the work plate in the same manner as has been previously described. However, as soon as the contactor C1 closes to shunt the lifting portion of the solenoid coil, plunger spring 22 immediately starts to plunge stud S towards the work plate W. The stud starts to plunge, at the same time full welding current is established across the arc between the stud and the work plate. When the time delay switch TD is set for a period of time longer than the required time for plunger spring 22 to move the stud S into the work plate W, the welding arc is snuffed out and welding current continues to flow through the stud and plate after they have come into contact. This feature is particularly useful in those instances where it is advisable to plunge the stud during the flow of welding current and where the stud is lifted from the plate only long enough to establish an arc therebetween.

Figure 4:
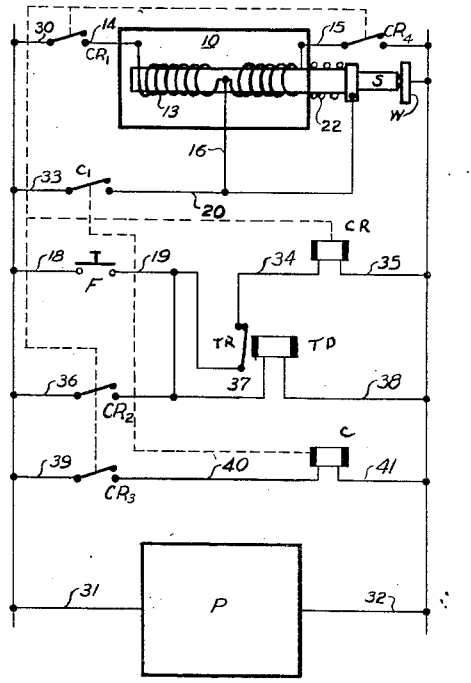
Figure 4 is a schematic illustration of another modification of the invention.

In the circuit of Figure 4 a control relay switch CR4 has been inserted in the solenoid coil lead 15. This switch CR4 is opened and closed with switches CR1, CR2 and CR3 by control relay coil CR. The variation in the method takes place after welding current starts to flow since the remainder of the circuit is identical with that of Figure 2. In this circuit after welding current has been flowing for a predetermined timed interval established by time delay relay switch TR, the switch TR opens to de-energize relay coil CR. De-energizing of relay coil CR opens switches CR1, CR2, CR3 and CR4. Opening of switch CR4 de-energizes the holding portion of the solenoid coil 13 and allows the plunger spring 22 to start plunging the stud S into the work plate W. Opening of the switch CR3 de-energizes contactor coil C to open contactor C1 and stop the flow of welding current. The time duration between the opening of switch CR4 and contactor C1 is dependent on the speed of operation of contactor coil C and contactor C1. When this contactor operates immediately, it will stop the flow of welding current between the stud and plate while the stud is moving towards the plate. This circuit, thus, allows welding current to flow while the plunger spring is overcoming the inertia of the stud and is starting to move it towards the plate.

In all of these different methods and circuits the arc is initiated by relatively low current flowing through the lifting portion of the solenoid coil in series with the stud and plate. Closing of a contactor to initiate flow of welding current shunts the lifting coil to eliminate this relatively small current and establish the heavy welding current across the arc established by the small current. The arc initiating current is not maintained throughout the weld cycle and is not superimposed on the welding current. Both the arc initiating and stud lifting current and the welding current are obtained from a single source of current P. Thus, with this circuit only a single generator, rectifier or set of batteries is needed for the welding operation.

Although this invention has been described in its preferred form with a certain degree of particularity enabling others to reproduce the invention, it is understood that the present disclosure has been made by way of example and that numerous modifications and changes in the details may be resorted to without departing from the spirit and scope of the invention as defined in the claims which are made a part hereof.

The embodiments of the invention in which an exclusive property or privilege is claimed are defined as follows:

1. In a stud welding device, a housing, a stud carrying member, resilient means urging the stud carrying member away from the housing, a solenoid in the housing including an armature operatively connected to the stud carrying member and a coil capable of overcoming the resilient means and drawing the armature and the stud carrying member towards the housing, first means including a switch for connecting one end of the solenoid coil to one side of a welding current source, a lead for connecting the other end of the solenoid coil to the other side of a welding current source, second means including a contactor for connecting the stud carrying member to the said one side of the welding current source and electrically connecting the stud carrying member to the solenoid coil at a point between the ends thereof, and timing means connected to and controlling said switch and said contactor.

2. The structure of claim 1 wherein said timing means is operative to close said switch prior to the closing of said contactor.

3. The structure of claim 1 wherein said timing means is operative to close said switch prior to the closing of said contactor and is operative to open said switch prior to the opening of said contactor.

4. The structure of claim 1 including a lead switch in said lead and controlled by the timing means to operate simultaneously with the switch in the first means.

5. The structure of claim 3 including a lead switch in said lead controlled by the timing means to operate simultaneously with the switch in the first means.

6. In a stud welding device, a housing, a stud carrying member, resilient means urging the stud carrying member away from the housing, a solenoid coil in the housing, solenoid armature means operatively connected to the stud carrying member, a welding current contactor, a switch, a first circuit connecting at least a first part of said solenoid coil and said switch in series with said stud carrying member, a second circuit connecting at least a second part of said solenoid in parallel with said stud carrying member, said contactor shunting the first part of said solenoid, and timing means controlling said switch and said contactor.

7. The structure of claim 6 wherein the timing means is operative to close the switch prior to the closing of the contactor and is operative to open the switch after the closing of the contactor and prior to the opening of the contactor.

8. The structure of claim 1 including a switch in said lead controlled by the timing means to close prior to the closing of the contactor and to open prior to the opening of the contactor.

9. The structure of claim 3 including a switch in said lead controlled by the timing means to close prior to the closing of the contactor and to open prior to the opening of the contactor.

10. In a stud welding device, a housing, a stud carrying member, resilient means urging the stud carrying member away from the housing, a solenoid in the housing including an armature operatively connected to the stud carrying member and a coil capable of overcoming the resilient means and drawing the armature and the stud carrying member towards the housing, first means connecting one end of the solenoid coil to one side of a welding current source, second means connecting the other end of the solenoid coil to the other side of a welding current source, third means including a contactor for connecting the stud carrying member to the said one side of the welding current source and electrically connecting the stud carrying member to the solenoid coil at a point between the ends thereof, a switch in at least one of said means, and timing means connected to and opening and closing said switch and said contactor in a predetermined sequence of operation.

11. In a stud welding device adapted to lift a stud from a work piece to draw an arc therebetween, a stud carrying member, a lifting coil, a holding coil, a first circuit connecting said lifting coil in series with said stud carrying member, a second circuit connecting said holding coil in parallel with said stud carrying member, and means controlling said first and second circuits.

12. In a stud welding device adapted to lift a stud from a work piece to draw an arc therebetween, a stud carrying member, a lifting coil, a holding coil, a first circuit including a switch connecting said lifting coil in series with said member, a second circuit including a contactor shunting at least said lifting coil and connecting said holding coil in parallel with said stud carrying member, and control means controlling said switch and said contactor.

References Cited in the file of this patent

UNITED STATES PATENTS

| | | |
|---|---|---|
| 2,265,169 | Hughes | Dec. 9, 1941 |
| 2,342,144 | Hughes | Feb. 22, 1944 |
| 2,462,882 | Martin | Mar. 1, 1949 |
| 2,467,723 | Barlow | Apr. 19, 1949 |
| 2,648,748 | Sayer | Aug. 11, 1953 |